United States Patent [19]

Goldstein et al.

[11] Patent Number: 5,232,798

[45] Date of Patent: * Aug. 3, 1993

[54] METHOD FOR INHIBITING CORROSION IN PARTICULATE ZINC

[75] Inventors: Jonathan Goldstein, Jerusalem; Arieh Meitav, Rishon Lezion; Michael Kravitz, Jerusalem, all of Israel

[73] Assignee: Electric Fuel (E.F.L.) Ltd., Jerusalem, Israel

[*] Notice: The portion of the term of this patent subsequent to Jul. 20, 2010 has been disclaimed.

[21] Appl. No.: 636,426

[22] Filed: Dec. 31, 1990

[51] Int. Cl.$^5$ ............................................. H01M 4/42
[52] U.S. Cl. .................................. 429/229; 252/387; 422/7
[58] Field of Search ........................... 422/7; 252/387; 429/229, 230

[56] References Cited

U.S. PATENT DOCUMENTS 4,957,826 9/1990 Cheiky .................................. 429/27

Primary Examiner—John Niebling
Assistant Examiner—Brian M. Bolam
Attorney, Agent, or Firm—Helfgott & Karas

[57] ABSTRACT

A method for the inhibition of corrosion in particulate zinc, comprises the step of subjecting the zinc in the form of an alkaline slurry to the action of a corrosion inhibiting effective amount of a corrosion inhibitor which is at least one oxide selected from the oxides of antimony, bismuth, cadmium, gallium, indium, lead, mercury, thallium and tin, and which preferably constitutes 0.05-4.0 parts by weight, based on the weight of the zinc. The particulate zinc may be that recovered electrolytically from at least partially spent electrolyte from a zinc-air battery. Corrosion inhibited particulate zinc which has been treated according to the above method, as well as a mixture of (untreated) particulate zinc with such treated zinc, also form part of the invention.

7 Claims, No Drawings

METHOD FOR INHIBITING CORROSION IN PARTICULATE ZINC

FIELD AND BACKGROUND OF THE INVENTION

The present invention relates to a method for the inhibition of corrosion in particulate zinc, especially for use in rechargeable zinc-air batteries generally, and more particularly, in such batteries intended for use in electric vehicles and energy storage systems.

Various proposals have been made in the past for electric powered vehicles. To date, for a number of reasons, electric vehicle systems have yet to become commercially viable generally, for urban and highway applications. There have been proposals to employ zinc/air batteries for urban vehicle propulsion. An example is the following publication: Improved slurry zinc/air systems as batteries for urban vehicle propulsion, by P. C. Foller, Journal of Applied Electrochemistry 16 (1986), 527-543.

Metal/air battery structures are described in the following publications: U.S. Pat. No. 4,842,963, entitled Zinc Electrode and Rechargeable Zinc-Air Battery; U.S. Pat. No. 4,147,839, entitled Electrochemical Cell with Stirred Slurry; U.S. Pat. No. 4,908,281, entitled Metal/air Battery with Recirculating Electrolyte; U.S. Pat. No. 3,847,671, entitled Hydraulically-Refuelable Metal-Gas Depolarized Battery System; U.S. Pat. No. 4,925,744, entitled Primary Aluminum-Air Battery; U.S. Pat. No. 3,716,413, entitled Rechargeable Electrochemical Power Supply; U.S. Pat. No. 4,925,744, entitled Primary Aluminum-Air Battery. In U.S. Pat. No. 3,592,698, entitled Metal Fuel Battery with Fuel Suspended in Electrolyte, there is described inter alia a method for circulating an electrolyte/metal fuel powder mixture through the batteries; U.S. Pat. No. 4,126,733, entitled Electrochemical Generator Comprising an Electrode in the Form of a Suspension, relates to a similar subject using a circulated suspension of inert cores coated with an electrochemically active material. In U.S. Pat. No. 4,341,847, entitled "Electrochemical Zinc-Oxygen Cell", there is described a method in which an electrolyte is circulated in the annular space between concentric electrodes.

Electrical energy storage systems are described in the following publications: U.S. Pat. No. 4,843,251 entitled Energy Storage and Supply Recirculating Electrolyte; Energy on Call by John A. Casazza et al, IEEE Spectrum June, 1976, pp 44-47; U.S. Pat. No. 4,275,310, entitled Peak Power Generation; U.S. Pat. No. 4,124,805, entitled Pollution-Free Power Generating and Peak Power Load Shaving System; U.S. Pat. No. 4,797,566, entitled Energy Storing Apparatus.

Regeneration of spent zinc-containing alkaline electrolyte is described in a number of prior patents. For example, in U.S. Pat. No. 3,847,671 (mentioned above) whole spent electrolyte is subjected to electrolysis, when zinc deposited at the cathode is removed with a wiper blade. The thus-removed zinc is said to be substantially heavier than the electrolyte (35-40% KOH) and thus falls to the bottom of each cell. In a particular embodiment, the cathode and anode are specified as being made from copper (or silver-plated copper) and carbon, respectively. In U.S. Pat. No. 3,981,747, it is proposed to regenerate the spent zinc in an alkaline electrolyte by reaction with a strongly electronegative metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by merely mechanically replacing zinc oxide particles by active zinc particles.

It is of importance in batteries containing zinc electrodes that the zinc should not be consumed by a reaction with aqueous electrolyte, especially alkaline electrolyte, which generates hydrogen gas, which reaction merely corrodes the zinc and prevents its availability of the latter for producing electric current. A number of prior patents relate to this problem. Thus, e.g., in U.S. Pat. No. 4,112,205, double salts containing both mercuric and quaternary ammonium ions, are used as inhibitors in galvanic cells comprising zinc anodes, notably in Leclanche type batteries containing ammonium chloride/zinc chloride electrolyte; U.S. Pat. No. 3,945,849 employs quaternary ammonium halides as inhibitor for zinc anodes in similar primary cells. U.S. Pat. No. 4,195,120 teaches alkaline cells containing a predominantly zinc anode and as a hydrogen evolution inhibitor, a surfactant which is an organic phosphate ester of the ethylene oxide adduct type. Metal oxide inhibitors for zinc (in practice ZnO) electrodes are described in U.S. Pat. No. 4,084,047, in which the inhibitors are mixed thoroughly into the ZnO; the inhibitors taught in this patent are binary combinations of oxides which exclude mercuric oxide, the latter being regarded as an unsatisfactory additive for the ZnO electrode. According to U.S. Pat. No. 4,084,047, it was known to mix or alloy the active zinc in zinc-zinc oxide anodes and its supporting grid (e.g. copper or silver structures) with 0.5-5.0 wt. % mercury or mercuric oxide). It will also be appreciated by persons skilled in the art that amalgamation of zinc with mercury has been known for a very long time and that it is carried out in neutral, or more usually in acid solution, e.g. by reacting zinc with mercuric chloride in dilute hydrochloric acid.

The disclosures of all of the foregoing publications (including patents), including also the prior art described therein, are explicitly incorporated herein by reference.

SUMMARY OF THE INVENTION

It is an object of the present invention to make possible from a practical point of view, the general commercial viability of metal-air batteries, more particularly for use in electric vehicle propulsion and energy storage systems. A more specific object of the invention is to provide a method for the inhibition of corrosion in particulate zinc, especially for use in rechargeable zinc-air batteries, and more particularly, in such batteries intended for use in electric vehicles and energy storage systems. Other objects of the invention will become apparent from the description which follows.

The present invention accordingly provides a method for the inhibition of corrosion in particulate zinc, which comprises the step of subjecting the zinc in the form of an alkaline slurry to the action of an effective corrosion inhibiting amount of at least one oxide selected from the oxides of antimony, bismuth, cadmium, gallium, indium, lead, mercury, thallium and tin; the at least one oxide preferably constitutes 0.05-4.0 parts by weight, based on the weight of the zinc. It may be noted that both red and yellow forms of mercuric oxide are useful in the practice of the invention.

The present invention also includes corrosion inhibited particulate zinc which has been treated according to the method of the invention, as well as a mixture of (untreated) particulate zinc with such treated zinc.

DETAILED DESCRIPTION OF THE INVENTION

In one embodiment of the present invention (which is not to be regarded as limitative) the slurry containing particulate zinc is one intended for use in metal-air batteries and comprises an admixture of at least components (a) and (b), of the following components (a), (b), (c), (d), (e), (f) and (g): (a) particulate zinc; (b) an aqueous solution of at least one Group Ia metal hydroxide; (c) an inorganic inhibitor ingredient effective to inhibit the interaction of zinc and at least one Group Ia metal hydroxide in aqueous solution, which would otherwise result in the evolution of hydrogen gas; (d) a gelling agent; (e) a particulate and/or fibrous filler; (f) a labelling agent; (g) a dissolved electrolyte extender.

Our copending patent application Ser. No. 07/636,226 filed Dec. 31, 1990 describes and claims slurries for use in metal-air batteries, which comprise essentially at least ingredients (a), (b) and (c), above, but in which component (a) is defined as particles comprising a metal selected from the group consisting of aluminum, iron and zinc, and component (c) is an inorganic inhibitor ingredient.

Our copending patent application Ser. No. 07/636,411 filed Dec. 3, 1990 describes and claims a process for regenerating an at least partially spent slurry, of the type described above, which is intended for use in zinc-air batteries, and in which component (a) is zinc which has been at least partly oxidized to an oxidation product selected from zinc oxide and zincates, component (b) is an aqueous solution of at least one Group Ia metal comprising anions selected from hydroxide and zincate, and component (c) could comprise a mercury compound, to at least steps (i), (ii), (iii) and (iv), of the following six steps, after optional dilution with at least one of aqueous Group Ia metal hydroxide(s) and water, namely:
(i) separating of the dissolved and undissolved phases;
(ii) electrolysing the separated dissolved phase, in a cell with a corrosion-resistant anode and a non-zinc-adherent cathode such that the zinc which deposits thereon self-detaches or is removable by a method selected from brushing and the use of liquid jets, until no more than a preselected amount of zinc remains in the solution, provided that the current density at the cathode is preselected so that in conjunction with the non-zinc-adherent characteristic of the cathode, the electrowon zinc will have, after consolidating into particles, a density within the range 0.3-1.4 g./cc and a surface area within the range 0.5-6.0 m$^2$/g.;
(iii) removing zinc from the cathode and consolidating it into particles, as e.g. by brushing or pumping;
(iv) combining zinc from step (iii) with the separated undissolved phase from step (i) and additional aqueous Group Ia metal hydroxide, and if desired other makeup components, thereby reconstituting charged slurry;
(v) analyzing at least one (A), (B) and (C), namely: (A) the separated undissolved phase from step (i) prior to combining step (iv); (B) the separated dissolved phase from step (i) prior to combining step (iv); (C) the reconstituted charged slurry obtained in step (iv); in order to ascertain whether at least the amount of zinc and the amount and concentration in the aqueous medium of the Group Ia metal hydroxide(s), lie within predetermined limits, and if desired to ascertain also whether the amount at least one of the hereinafter recited optional slurry components, to the extent that they may be present, lie within predetermined limits, namely: inorganic inhibitor, gelling agent, filler, labelling agent and dissolved electrolyte extender;
(vi) adjusting the amounts to within predetermined limits of at least one of the following in the reconstituted charged slurry, namely, zinc, Group Ia metal hydroxide(s), water, inorganic inhibitor, gelling agent, filler, labelling agent and dissolved electrolyte extender.

The entire disclosures of our above-mentioned copending applications are explicitly incorporated herein by reference.

In the slurry in which the zinc has been subjected to treatment with the at least one oxide in accordance with the method of the invention, the weight ratio zinc: aqueous Group Ia metal hydroxide(s) solution: component (c) is preferably 1:0.5-2.0: 0.0005-0.04. Components (d), (e), (f) and (g), if any or all of these are present in the reconstituted charged slurry, are preferably present within the following weight percentages based on the weight of the total slurry, namely, (d) 0.3-3.0%, (e) 1.0-10.0%, (f) 0.001-1.0% and (g) 0.1-10.0%, provided that the percentage of zinc in the slurry is within the range of 33.3-67.0 wt. %, preferably 45.0-60.0 wt. %.

Illustratively, slurry of particulate zinc subjected to the method of the invention may be from 5 to 12 molar in Group Ia metal hydroxide (e.g. KOH) and may contain from 30 to 100 g./l. dissolved zinc.

The method of the invention will now be illustrated by the following non-limitative Examples.

EXAMPLE I

Clear filtrate (250 ml.) containing 30 wt. % aqueous potassium hydroxide and 5 wt. % zinc oxide (as zincate), obtained by separating solid and liquid components of a partially spent zinc-containing electrolytic slurry, as described in the Example of our copending patent application (11785), was transferred to an electrolytic bath which contained two immersed nickel anodes flanking a central stainless steel cathode. Each plate had the dimensions 50×50×1 mm., and was fitted with current carrying leads; there was a 10 mm. space on each side between the cathode and the anodes.

The electrolyte was circulated at a rate of 25 ml./minute while a current of 25 A was applied (500 milliamp/cm$^2$ at the cathode) at a voltage of 3 V. The bath temperature was maintained at 20°-30° C. by external cooling. The electrolyte returning from the cooler was directed so as to stream between the plates, entering at the base of the bath and exiting at above the level of the top of the plates, thereby immediately removing the hot liquid zone and any gas bubbles. From time to time, deionized water or alkali was added to the bath to maintain the alkali concentration.

The cathode was transferred to a separate container every ten minutes, where the deposited zinc was removed and consolidated into a particulate structure by means of a revolving nylon brush, while a clean cathode was placed in the electrolytic bath to continue the zinc recovery process. The brush was operated at 1000 rpm for three minutes, which afforded alkali-moist zinc particles below about 30 mesh particle size and having a bulk density of 0.6 g./cc.

After about 30 minutes of electrolysis, there was obtained a quantity of alkali-moist zinc, containing about 12.5 g. dry zinc, thus indicating a current efficiency of about 80% at the specified current density. This product was introduced into 250 ml. of 30 wt. % KOH solution, to which 0.4 g. red mercuric oxide had been added, and the mixture was stirred at 50° C. for one hour, at the end of which all the red color had disappeared, indicating that the mercuric oxide had been taken up by the zinc. At this stage the product was filtered off through a porous nylon cloth, for later slurry reformulation. By gasometric methods, it was found to have a low gassing rate for hydrogen, $5 \times 10^{-3}$ ml./min./g. zinc (compared to 0.2 ml./min./g. zinc for untreated zinc), on attempted reaction with 30 wt. % KOH at 60° C.

It was surprisingly found that the HgO-treated zinc remaining after slurry discharge in cells could be used to protect untreated electrolytically recovered zinc by mixing therewith, and this was also found to be the case for zinc treated originally with other inhibitor oxides. For example, with HgO-treated zinc the slurry residue from discharging as much as 95% of the total available zinc in a cell, after reformulating with the required makeup quantity of freshly electrowon zinc, provided acceptable inhibition of corrosion on repeated recycling, with minimal makeup inhibitor. The HgO-treated zinc was mixed with 12.5 g. 30 wt. % aqueous potassium hydroxide, and the slurry gelled with 0.25 g. polyacrylic acid, when it had a density of about 2 g./ml. About 10 ml. of gelled slurry, which exhibited neither obvious segregation of zinc particles nor generation of hydrogen bubbles, were introduced into the slurry compartment of a zinc-air cell. The cell provided 1 A for five hours at an average discharge rate of 1.2 V, until a cut-off voltage of 1 V. Since there were about 10 g. zinc in the cell, the zinc utilization was about 60%. When the discharge was run with untreated zinc, the cell passivated after one hour due to excessive hydrogen gassing which blocked the electrolyte path to the air electrodes of the cell.

EXAMPLE II

Following the details of Example I, but substituting yellow for red mercuric oxide, gave similar results, but all the yellow mercuric oxide had been utilized after 15 minutes at 50° C. in the procedure of Example I.

EXAMPLE III

Following the details of Example I, but substituting lead oxide (PbO) for mercuric oxide, gave similar results, but the corrosion rate was somewhat higher, 0.04 ml./min./g. zinc.

While the invention has been particularly described, it will be appreciated by persons skilled in the art that many modifications and variations are possible. The invention is accordingly not to be construed as limited to the particularly described embodiments, rather its concept, scope and spirit are to be understood in the light of the claims which follow.

We claim:

1. A method for the inhibition of corrosion in particulate zinc, which comprises the step of subjecting said zinc in the form of an alkaline slurry to treatment by a corrosion inhibiting effective amount of a corrosion inhibitor which is at least one oxide selected from the group consisting of oxides of antimony, bismuth, cadmium, gallium, indium, lead, mercury, thallium and tin, wherein zinc has been obtained by an electrolytic process for regeneration of zinc in an at least partially spent slurry for use in metal-air batteries which slurry comprises an admixture of at least components (a) and (b), of the following components (a), (b), (c), (d), (e), (f) and (g):
   (a) zinc which has been at least partly oxidized to an oxidation product selected from zinc oxide and zincates;
   (b) an aqueous solution of at least one Group Ia metal comprising anions selected from the group consisting of hydroxide and zincate;
   (c) an inorganic inhibitor ingredient effective to inhibit an interaction of zinc and at least one Group Ia metal hydroxide in the aqueous solution, which would otherwise result in an evolution of hydrogen gas;
   (d) a gelling agent;
   (e) a filler selected from the group consisting of particulate and fibrous fillers;
   (f) a labelling agent;
   (g) a dissolved electrolyte extender.

2. A method according to claim 1, wherein the amount of at least one oxide constitutes 0.05–4.0 percent by weight, based on the weight of the zinc.

3. A method according to claim 1, wherein zinc which has been subjected to the action of a corrosion inhibitor is then mixed with at least component (b) of the following components (a), (b), (c), (d), (e), (f), and (g):
   (a) electrolytically prepared zinc which has not been subjected to treatment with at least one oxide
   (b) an aqueous solution of at least one Group Ia metal hydroxide;
   (c) an inorganic inhibitor, effective to inhibit the interaction of zinc and at least one Group Ia metal hydroxide in aqueous solution, which would otherwise result in the evolution of hydrogen gas;
   (d) a gelling agent;
   (e) a filler selected from the group consisting of particulate and fibrous fillers;
   (f) a labelling agent;
   (g) a dissolved electrolyte extender.

4. Process according to claim 3, wherein preselected amounts of said components are used, such that in the obtained mixture the total zinc: Group Ia metal hydroxide weight ratio is within the range 1: 0.5–2.0; when component (c) is present the total zinc: (c) weight ratio is within the range 1: 0.0005–0.04; and if at least one of components (d), (e), (f) and (g) is present in the reconstituted charged slurry, it(they) are present within the following weight percentages based on the weight of the total slurry, namely, (d) 0.3–3.0%, (e) 1.0–10.0%, (f) 0.001–1.0% and (g) 0.1–10.0%, provided that the percentage of total zinc in the slurry is adjusted to within the range of 33.3–67.0 wt. %.

5. Process according to claim 1, wherein said particulate zinc is selected from the group consisting of particulate zinc which has been subjected to treatment in an alkaline medium with an effective corrosion inhibiting amount of at least one oxide selected from the oxides of antimony, bismuth, cadmium, gallium, indium, lead, mercury, thallium and tin, and particulate zinc which has been admixed with an effective corrosion inhibiting amount of said particulate zinc subjected to said treatment.

6. A Process according to claim 5, wherein the particulate zinc has a density within the range 0.3–1.4 g./cc and a surface area within the range 0.5–6.0 m²/g.

7. A method for the inhibition of corrosion in particulate zinc, which comprises the step of subjecting said zinc in the form of an alkaline slurry to treatment by a corrosion inhibiting effective amount of a corrosion inhibitor which is at least one oxide selected from the group consisting of oxides of antimony, bismuth, cadmium, gallium, indium, lead, mercury, thallium and tin, wherein zinc has been obtained by an electrolytic process for regeneration of zinc in an at least partially spent slurry for use in metal-air batteries which slurry comprises an admixture of at least components (a) and (b), of the following components (a), (b), (c), (d), (e), (f) and (g):

(a) zinc which has been at least partly oxidized to an oxidation product selected from zinc oxide and zincates;

(b) an aqueous solution of at least one Group Ia metal comprising anions selected from the group consisting of hydroxide and zincate;

(c) an inorganic inhibitor ingredient effective to inhibit an interaction of zinc and at least one Group Ia metal hydroxide in the aqueous solution, which would otherwise result in an evolution of hydrogen gas;

(d) a gelling agent;

(e) a filler selected from the group consisting of particulate and fibrous fillers;

(f) a labelling agent;

(g) a dissolved electrolyte extender, and wherein the regeneration process comprises the steps of subjecting at least partially spent slurry, after dilution with at least one of aqueous Group Ia metal hydroxides and water, to at least steps (i), (ii), (iii) and (iv) of the following six steps:

(i) separating of dissolved and undissolved phases;

(ii) electrolysing the separated dissolved phase, in a cell with a corrosion-resistant anode and a non-zinc-adherent cathode such that the zinc which deposits thereon self-detaches or is removable by a method selected from brushing and use of liquid jets, provided that a current density at the cathode is selected so that in conjunction with the non-zinc-adherent characteristic of the cathode, the electron zinc will have, after consolidating into particles, a density within the range 0.3–1.4 g./cc and a surface area within the range 0.5–6.0 m²/g.;

(iii) removing zinc from the cathode and consolidating it into particles;

(iv) combining zinc from step (iii) with the separated undissolved phase from step (i) and additional aqueous Group Ia metal hydroxide, thereby reconstituting charged slurry;

(v) analyzing at least one of (A), (B) and (C) wherein (A) is a separated undissolved phase from the step (i) prior to the combining step (iv), (B) is a separated dissolved phase from the step (i) prior to the combining step (iv), (C) is a reconstituted charged slurry obtained in the step (iv), in order to ascertain whether at least the amount of zinc and the amount of concentration in the aqueous medium of the Group Ia metal hydroxide lie within predetermined limits, and also to ascertain whether the amount at least one of slurry components including inorganic inhibitor, gelling agent, filler, labelling agent and dissolved electrolyte extender lie within predetermined limits, (vi) adjusting the amounts to predetermined limits of at least one of the components in the reconstituted charged slurry, which include zinc, Group Ia metal hydroxides, water, inorganic inhibitor, gelling agent, filler, labelling agent and dissolved electrolyte extender.

* * * * *